(12) United States Patent
Tenzer et al.

(10) Patent No.: US 6,349,816 B1
(45) Date of Patent: Feb. 26, 2002

(54) FLUTED CONVEYOR BELT CLEANER SCRAPER BLADE

(75) Inventors: Michael M. Tenzer, Grolsheim; Uwe Kohler, Forst, both of (DE)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 09/547,326

(22) Filed: Apr. 11, 2000

Related U.S. Application Data

(60) Provisional application No. 60/129,442, filed on Apr. 15, 1999.

(51) Int. Cl.[7] ............................................. B65G 45/12
(52) U.S. Cl. ...................................... 198/497; 198/499
(58) Field of Search .................................. 198/497, 499

(56) References Cited

U.S. PATENT DOCUMENTS

| | | |
|---|---|---|
| 1,776,419 A | 9/1930 | Dodge |
| 2,276,412 A | 3/1942 | Moore |
| 3,296,719 A | 1/1967 | Penote et al. |
| 3,315,794 A | 4/1967 | Ellington |
| 3,952,863 A | 4/1976 | Schattauer |
| 3,971,148 A | 7/1976 | Deal |
| 3,998,322 A | 12/1976 | McBride |
| 4,131,194 A | 12/1978 | Andersson |
| 4,280,616 A | 7/1981 | Wadensten |
| 4,349,098 A | 9/1982 | Vennhof |
| 4,498,577 A | 2/1985 | Veenhof |
| 4,625,856 A | 12/1986 | Haas, Sr. et al. |
| 4,682,682 A | 7/1987 | Hartlepp |
| 4,836,356 A | 6/1989 | Mukai et al. |
| 4,887,329 A * | 12/1989 | Perneczky ............... 198/499 X |
| 5,339,947 A | 8/1994 | Campanile |
| 5,413,208 A | 5/1995 | Veenhof |
| 5,647,476 A | 7/1997 | Veenhof |
| 5,797,477 A | 8/1998 | Veenhof |
| 5,944,167 A * | 8/1999 | Brink ....................... 198/499 X |
| 6,041,913 A * | 3/2000 | Dolan ........................... 198/499 |

FOREIGN PATENT DOCUMENTS

| | | | |
|---|---|---|---|
| DE | 2528002 | * 3/1976 | ................. 198/499 |
| GB | 61800 | * 2/1949 | ................. 198/499 |
| SU | 982994 | * 12/1982 | ................. 198/499 |

* cited by examiner

Primary Examiner—James R. Bidwell
(74) Attorney, Agent, or Firm—Lee, Mann, Smith, McWilliams, Sweeney & Ohlson

(57) ABSTRACT

A scraper blade for a conveyor belt cleaner including a mounting base and a scraping tip. The scraping tip includes a bottom end attached to the mounting base, a corrugated front surface extending from the bottom end to a serrated first edge, and a corrugated rear surface extending from the bottom end to a serrated second edge. An end wall extends between the first edge and the second edge. The serrated first edge is adapted to be placed in scraping engagement with the belt of a conveyor to remove adherent material.

37 Claims, 6 Drawing Sheets

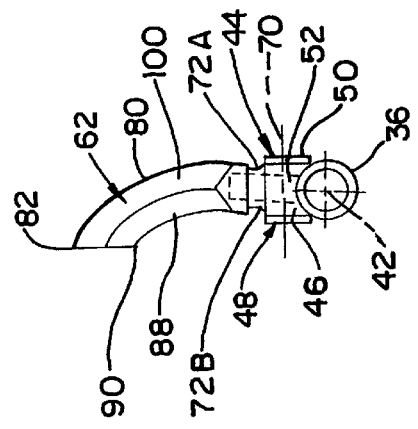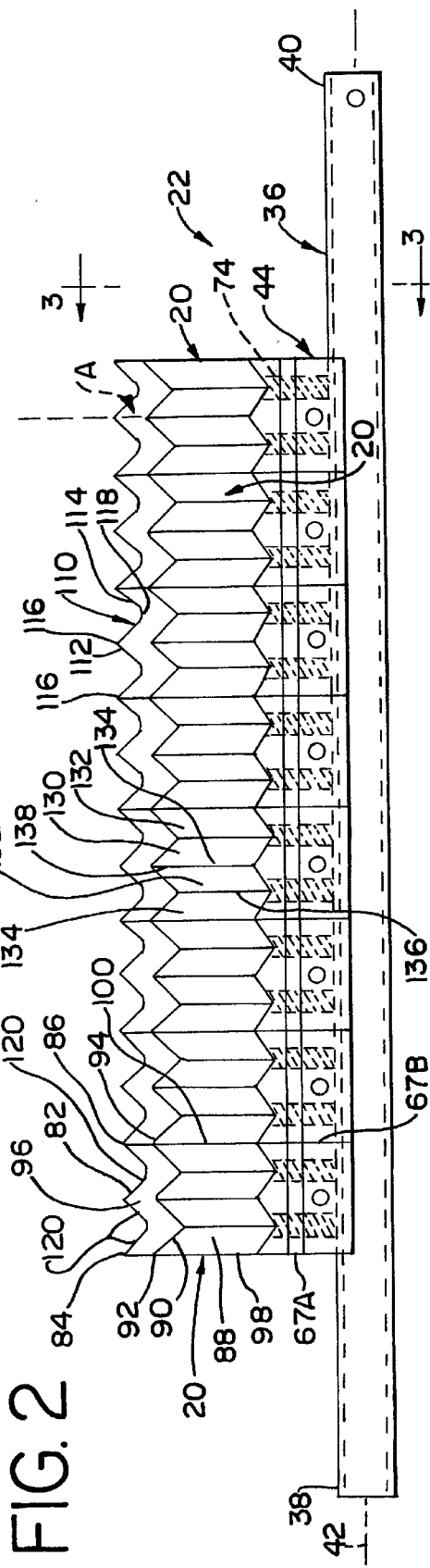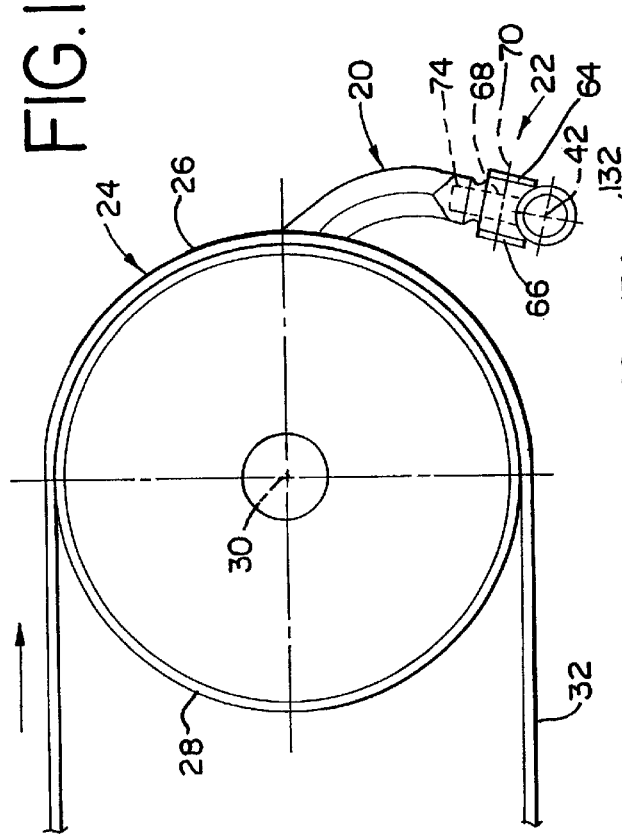

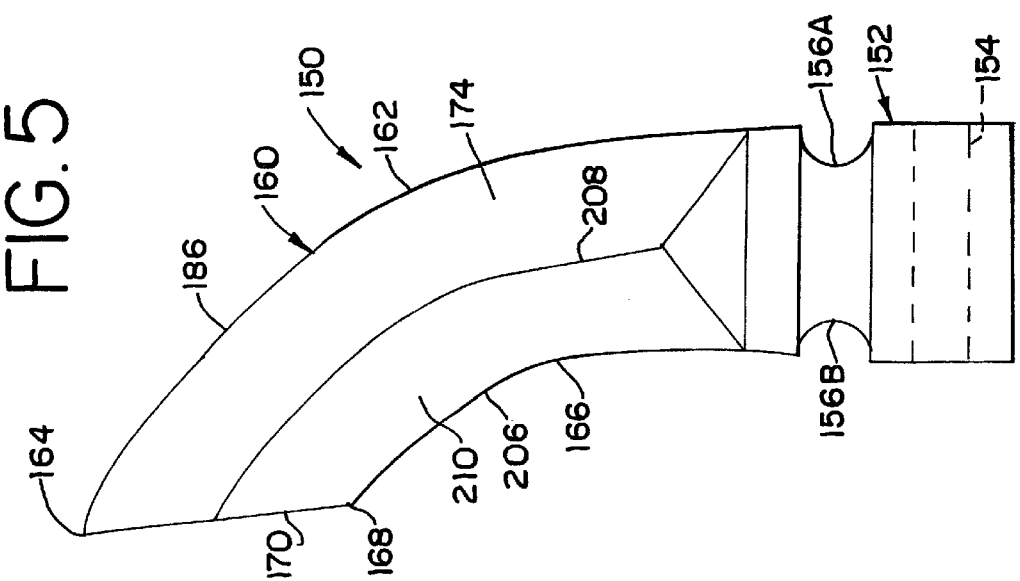
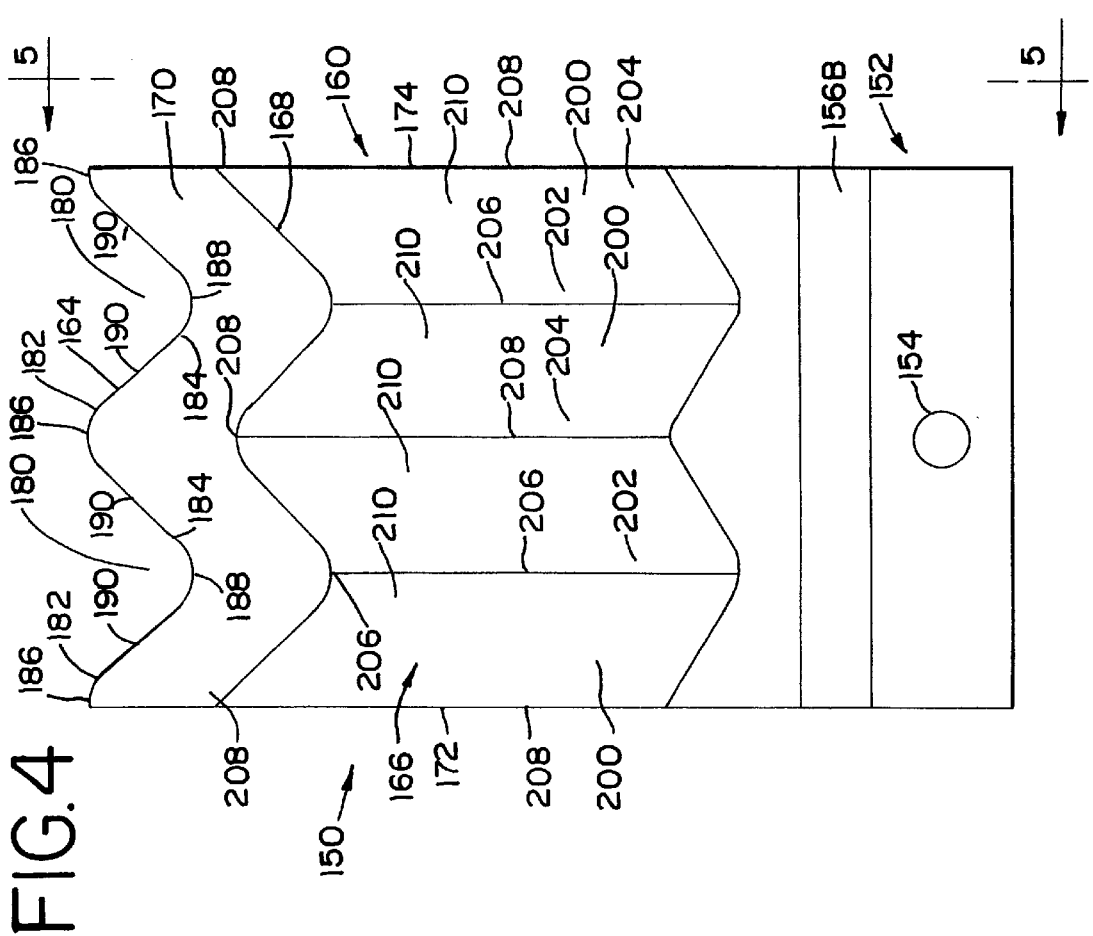

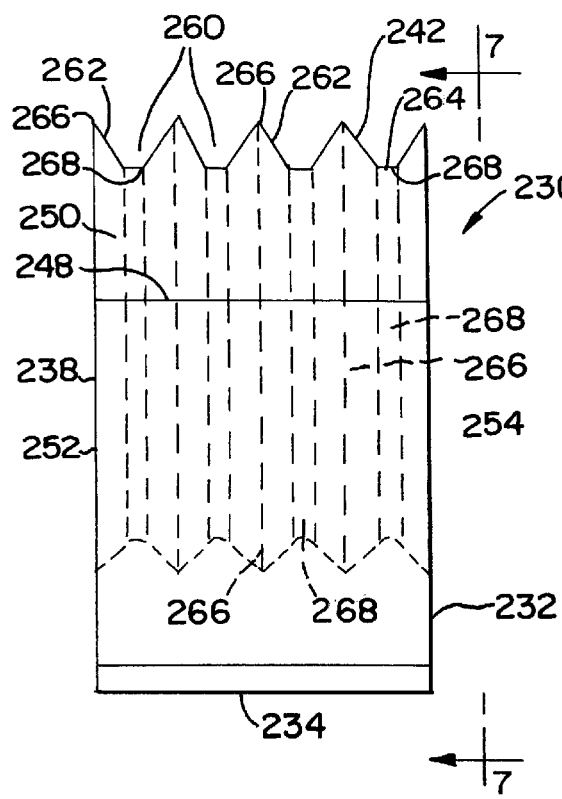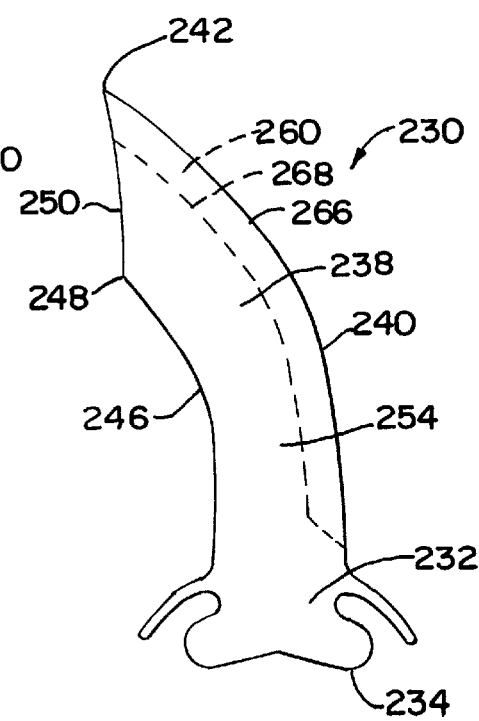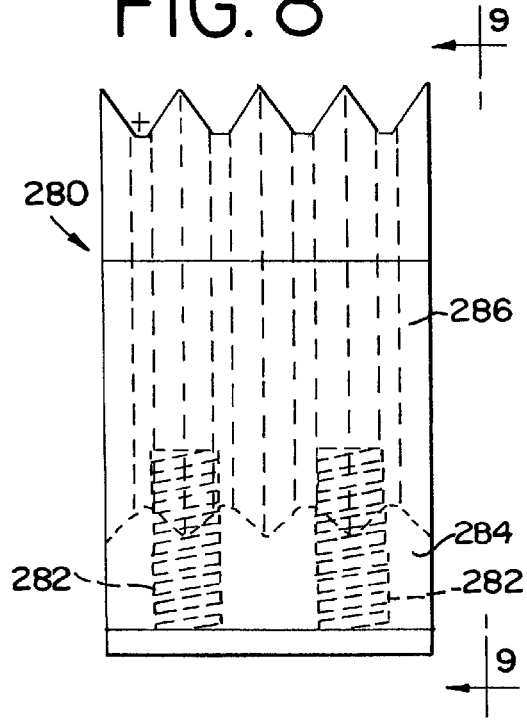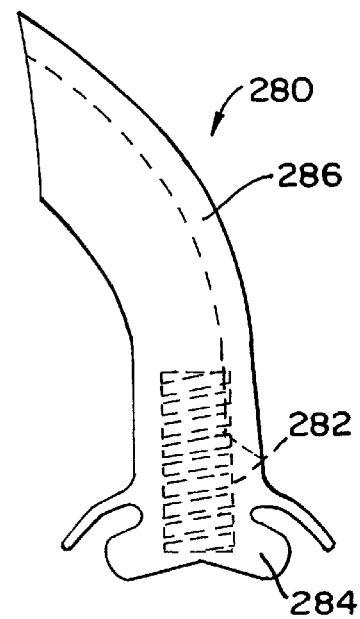

FLUTED CONVEYOR BELT CLEANER SCRAPER BLADE

RELATED APPLICATIONS

This application claims the benefit of U.S. Provisional Application No. 60/129,442, filed Apr. 15, 1999.

BACKGROUND OF THE INVENTION

The present invention is directed to a scraper blade for a conveyor belt cleaner, and in particular to a scraper blade including a plurality of elongate flutes that form a generally corrugated scraping surface having a serrated scraping edge.

Conveyors transport various types of bulk material such as sand, grain, coal and ores on a rotating conveyor belt. Conveyor belt cleaners are used to remove conveyed material that remains adhered to the rotating conveyor belt after the remainder of the conveyed material has been discharged. Prior conveyor belt cleaners include scraper blades which have a generally linear scraping edge that engages the belt. The linear scraping edge of prior conveyor belt cleaner scraper blades engages the outer surface of the conveyor belt transversely, at a ninety degree angle, to the direction of travel of the conveyor belt. As the scraping edge of prior scraper blades extends linearly from a first end of the scraping edge to a second end of the scraping edge, the length of the scraping edge is as short as is possible.

SUMMARY OF THE INVENTION

A scraper blade for a conveyor belt cleaner. The scraper blade includes a mounting base adapted to be attached to the cross shaft of the conveyor belt cleaner and a scraping tip attached to and extending outwardly from the mounting base. One or more resilient biasing members are located within the mounting base and are adapted to provide pivotal movement of the scraping tip with respect to the mounting base. The scraping tip includes a bottom end and a top end, a front surface extending from the bottom end to a first edge at the top end, and a rear surface extending from the bottom end to a second edge at the top end. The first edge is adapted to be placed in scraping engagement with a conveyor belt along the entire length of the first edge. An end wall extends between the first edge and the second edge. The first edge of the front surface extends between a first end and a second end and has a generally serrated configuration. The front surface of the scraping tip includes a plurality of flutes extending from the first edge toward the bottom end of the scraping tip such that the front surface has a generally corrugated configuration. The front surface of the scraping tip includes one or more elongate ridges and one or more elongate valleys that extend from the first edge toward the bottom end of the scraping tip, wherein each valley is located adjacent to a respective ridge. The ridges and the valleys of the front surface may be generally V-shaped or generally U-shaped. The second edge of the rear surface of the scraping tip may be generally linear or may have a generally serrated configuration. The rear surface of the scraping tip may include a plurality of flutes extending from the second edge toward the bottom end of the scraping tip such that the rear surface has a generally corrugated configuration with one or more elongate ridges and one or more elongate valleys. The ridges of the front surface are generally aligned with the valleys of the rear surface, and the valleys of the front surface are generally aligned with the ridges of the rear surface, such that the scraping tip has a generally uniform thickness between the front surface and the rear surface.

BRIEF DESCRIPTION OF THE DRAWING FIGS.

FIG. 1 is a side elevational view of a conveyor belt cleaner including one or more fluted scraper blades of the present invention shown in scraping engagement with a rotating conveyor belt.

FIG. 2 is a front elevational view of a conveyor belt cleaner including a plurality of fluted scraper blades.

FIG. 3 is a cross-sectional view taken along line 3—3 of FIG. 2.

FIG. 4 is a rear elevational view of a modified embodiment of the fluted scraper blade of the present invention.

FIG. 5 is a side elevational view taken along the line 5—5 of FIG. 4.

FIG. 6 is a rear elevational view of another modified embodiment of the fluted scraper blade of the present invention.

FIG. 7 is a side elevational view taken along line 7—7 of FIG. 6.

FIG. 8 is a further modified embodiment of the fluted scraper blade of the present invention.

FIG. 9 is a side elevational view taken along line 9—9 of FIG. 8.

DETAILED DESCRIPTION OF THE PREFERRED EMBODIMENTS

Figure 10A:
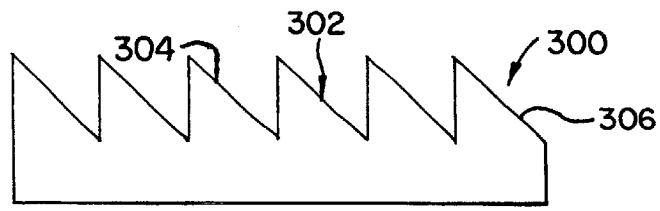
FIG. 10A is a partial rear elevational view of a modified embodiment of the fluted scraper blade with a serrated scraping edge having a saw-tooth configuration.

One embodiment of the scraper blade 20 of the present invention is shown in FIGS. 1–3 as part of a conveyor belt cleaner 22. As shown in FIG. 1, the scraper blade 20 is in scraping engagement with a conveyor belt 24 having an outer surface 26. The conveyor belt 24 is wrapped partially around a generally cylindrical head pulley 28. The head pulley 28 and conveyor belt 24 rotate about a central longitudinal axis 30 of the head pulley 28. As shown in FIG. 1, the conveyor belt cleaner 22 is a primary conveyor belt cleaner such that the scraper blades 20 engage the outer surface 26 of the conveyor belt 24 at a location where the conveyor belt 24 is curved and wrapped around the head pulley 28. The fluted scraper blades of the present invention may also be used in connection with secondary conveyor belt cleaners wherein the scraper blades engage the outer surface 26 of the return run 32 of the conveyor belt 24 that is spaced apart from the head pulley 28 and that is generally planar.

The conveyor belt cleaner 22, in addition to including one or more scraper blades 20, includes an elongate cross shaft 36 having a first end 38 and second end 40. The cross shaft 36 includes a central longitudinal axis 42. A mounting member 44 is attached to the cross shaft 36 and is adapted to removably mount one or more scraper blades 20 to the cross shaft 36. The mounting member 44 as shown in FIGS. 1–3, includes a first generally planar plate 46 having one or more apertures 48 and a second generally planar plate 50 including one or more apertures 52. The first and second plates 46 and 50 are attached at their bottom ends to the cross shaft 36 such that the first and second plates 46 and 50 are spaced apart and generally parallel to one another, and such that each aperture 48 in the first plate 46 is aligned with a respective aperture 52 in the second plate 50. The mounting member 44 may be constructed in various other manners as are well known in the art to enable a scraper blade to be removably attached to the cross shaft 36. The mounting member 44 connects the scraper blades 20 to the cross shaft 36 for conjoint rotation with the cross shaft 36 about the central axis 42. A conveyor belt cleaner tensioner device (not shown), as are well known in the art, may be attached to the first end 38 and/or second end 40 of the cross shaft 36 to provide rotational movement of the cross shaft 36 and scraper blades 20 about the central axis 42 and thereby bias the scraper blades 20 into scraping engagement with the outer surface 26 of the conveyor belt 24.

The scraper blade 20 includes a mounting base 60 and a scraping tip 62. The mounting base 60 is generally rectangular and includes a generally planar front wall 64 and a spaced apart and generally parallel planar rear wall 66. The front and rear walls 64 and 66 extend between a generally planar side wall 67A and a generally planar side wall 67B that is spaced apart and generally parallel to the side wall 67A. A generally cylindrical bore 68 having a linear central axis 70 extends from the front wall 64 to the rear wall 66. The mounting base 60 is adapted to be located between the first plate 46 and the second plate 50 of mounting member 44 such that the front wall 64 and rear wall 66 are respectively located adjacent to the first plate 46 and second plate 50, and such that the bore 68 of the mounting base 60 is an alignment with an aperture 48 in the first plate 46 and with an aperture 52 in the second plate 50. A fastener such as a bolt or pin may be inserted through the apertures 48 and 52 and the bore 68 to removably connect the scraper blade 20 to the cross shaft 36.

The mounting base 60 includes a generally linear groove 72A that extends along the width of the front wall 64, and the rear wall 66 includes a generally linear groove 72B that extends along the width of the rear wall 66. The grooves 72A–B are generally semi-circular and are spaced apart and generally parallel to one another. The grooves 72A–B are located between the scraping tip 62 and the bore 68. As shown in FIGS. 1–3, the mounting base 60 of the scraper blade 20 includes a plurality of resilient helical springs 74 that extend from a first end located adjacent the bottom of the mounting base 60 to a second end that is located adjacent to or within the bottom end of the scraping tip 62. The grooves 72A–B and springs 74 facilitate pivotal movement of the scraping tip 62 with respect to the mounting base 60.

The scraping tip 62 of the scraper blade 20 is attached to and extends outwardly from the top end of the mounting base 60. The scraping tip 62 includes a front scraping surface 80 that extends from the front wall 64 of the mounting base 60 to a scraping edge 82. The scraping edge 82 includes a first end 84 and a second end 86 and has a non-linear configuration such as a generally serrated configuration. The scraping edge 82 is non-linear, that is it does not form a single straight line between its ends 84 and 86, although it may include one or more linear segments. A serrated edge or serrated configuration is non-linear and includes one or more teeth or ridges and one or more notches or valleys in an alternating configuration. The serrated scraping edge 82 may have one or more undulating configurations such as a generally polygonal configuration including a plurality of linear segments arranged end to end in a non-linear manner such as in a saw-tooth or screw thread configuration, a generally sinusoidal wave configuration, a generally square-wave configuration, or a combination thereof The height of the ridges may vary from ridge to ridge, and the distance between adjacent ridges may vary along the length of the scraping edge 82, such that the scraping edge has an irregular configuration or pattern of ridges. A rear surface 88 extends from the rear wall 66 of the mounting base 60 to a non-linear serrated edge 90. The serrated edge 90 includes a first end 92 and a second end 94. An end wall 96 extends between the serrated edge 90 and the serrated scraping edge 82. The end wall 96 may be generally planar or may be generally concavely and cylindrically curved.

The scraping tip 62 also includes a generally planar first side wall 98 and a generally planar second side wall 100 that is spaced apart from and generally parallel to the first side wall 98. The first side wall 98 extends from the side wall 67A of the mounting base 68 to the end wall 96 and extends between a first side edge of the rear surface 88 and a first side edge of the front scraping surface 80. The second side wall 100 extends from the side wall 67B of the mounting base 60 to the end wall 96 and extends between a second side edge of the rear surface 88 and a second side edge of the front scraping surface 80. The first end 84 of the serrated scraping edge 82 and the first end 92 of the serrated edge 90 are located at the first side wall 98. The second end 86 of the serrated scraping edge 82 and the second end 94 of the serrated edge 90 are located at the second side wall 100.

The front scraping surface 80 of the scraping tip 62 includes a plurality of generally parallel elongate grooves or flutes 110 that extend in a generally linear or curvilinear manner from the serrated scraping edge 82 at the top end of the scraping tip 62 toward the bottom end of the scraping tip 62. The flutes 110 form a plurality of generally parallel elongate teeth or ridges 112 and a plurality of generally parallel elongate valleys 114. A valley 114 is located between each adjacent pair of ridges 112. Each ridge 112 includes an elongate apex 116 that extends from the serrated scraping edge 82 toward the mounting base 60. Each valley 114 includes an elongate nadir 118 that extends from the serrated scraping edge 82 toward the mounting base 60. Each ridge 112 includes an elongate side wall 120 that extends from the apex 116 of the ridge 112 to an adjacent nadir 118. The apexes 116 and the nadirs 118 are generally equally spaced apart from one another in an alternating manner across the width of the front scraping surface 80, from the first side wall 98 to the second side wall 100. The front scraping surface 80 has a generally corrugated configuration including alternating ridges and valleys. The front scraping surface 80 may be corrugated in one or more configurations or patterns, such as a generally polygonal wave configuration, a generally sinusoidal wave configuration, a generally square-wave configuration, or a combination thereof. The height of the ridges may vary from ridge to ridge, and the distance between adjacent ridges may vary across the width of the front surface 80, such that the front surface 80 has a irregular configuration or pattern of ridges.

As shown in FIG. 2, the ridges 112 and apexes 116 are pointed or generally V-shaped and the valleys 114 and nadirs 118 are concavely curved or generally U-shaped. The side walls 120 extend generally linearly between the apexes 116 and the curved valleys 114. The configuration of the serrated scraping edge 82 conforms to the configuration of the scraping surface 80 and includes V-shaped apexes and U-shaped nadirs.

The rear surface 88 of the scraping tip 62 includes a plurality of parallel elongate flutes 130 that extend from the serrated edge 90 toward the mounting base 60. The flutes 130 form a plurality of elongate ridges 132 and a plurality of elongate valleys 134. Each ridge 132 is located between a pair of adjacent valleys 134. Each ridge 132 includes an elongate apex 136 and each valley 134 includes an elongate nadir 138. As shown in FIG. 2, each ridge 132 and apex 136 is pointed or generally V-shaped, and each valley 134 and nadir 138 is also generally V-shaped.

As can be seen in FIG. 2, the length of the serrated scraping edge 82 between the first end 84 and the second end 86, as it follows the contours of the ridges 112 and valleys 114 is substantially longer, and may be twice as long or more, than the length a scraping edge would have that extends linearly between the first end 84 and the second end 86. The width of the flutes 110 and thereby the distance between each adjacent pair of apexes 116, and the distance between each adjacent pair of nadirs 118, may be varied as desired. The depth of the flutes 110 and thereby the depth of the nadirs 118 with respect to the height of the apexes 116 of the ridges 112 may also be varied as desired. In one preferred configuration, the depth of the flute 130 from the height of the apex 116 to the depth of the nadir 118 is approximately equal to one-half of the width of the flute 110 from the apex 116 of a ridge 112 to the apex 116 of an adjacent ridge 112. In such a configuration, the side walls 120 of each ridge 112 are respectively located at a cleaning angle "A" as shown in FIG. 2 of approximately forty-five degrees to the longitudinal length and direction of travel of the conveyor belt 24.

As shown in FIG. 2, each apex 116 of the ridges 112 in the front scraping surface 80 is aligned with and located across from a nadir 138 of a valley 134 in the rear surface 88. Similarly, each nadir 118 of the valleys 114 of the front scraping surface 80 is aligned with and located across from an apex 136 of a ridge 132 of the rear surface 88. Thus the apexes 116 and the nadirs 118 of the front scraping surface 80 and serrated scraping edge 82 are aligned in phase with the apexes 136 and nadirs 138 of the serrated edge 90 and rear surface 88. The thickness of the scraping tip 62 between the scraping surface 80 and the rear surface 88 thereby remains approximately constant across the width of the scraping tip 62. Also as shown in FIG. 2, the first and second side walls 98 and 100 of the scraping tip 62 are located at an apex 116 of a ridge 112 of the front scraping surface 80. When two or more of the scraper blades 20 are placed side by side as shown in FIG. 2 the configuration of the serrated edges 82 and 90 and the configuration of the front and rear surfaces 80 and 88 continue uniformly and unbroken from one scraper blade 20 to the next adjacent scraper blade 20.

The width and depth of each flute 110 and the width and depth of each flute 130 may be varied as desired from one flute to the next. The apexes 116 and 136 may be pointed or V-shaped as shown in FIG. 2, or they may be convexly curved or U-shaped, or they may be formed by a generally planar wall that is linear in a transverse direction and that may be linear or curved in a longitudinal direction. The nadirs 118 and 138 may also be pointed or V-shaped, concavely curved or U-shaped, or formed by a generally planar wall. The scraper blade 20 may be formed from an elastomeric material such as urethane, and may include wear-resistant scraping elements that may be formed from metal or ceramic materials.

In operation, one or more scraper blades 20 are attached to the cross shaft 36. The scraper blades 20 are then rotated about the axis 42 such that the end wall 96 and the serrated scraping edge 82 are biased in scraping engagement with the outer surface 26 of the conveyor belt 24. The scraping edge 82 is adapted to engage the conveyor belt 24 substantially continuously along the entire length of the scraping edge 82. The serrated scraping edge 82 and the corrugated front scraping surface 80 are adapted to engage and remove any conveyed material that remains adhered to the outer surface 26 of the conveyor belt 24 after the conveyed material has been discharged. The serrated scraping edge 82 and the corrugated front scraping surface 80 provide improved cleaning efficiency over scraper blades that have a generally linear scraping edge. The longer length of the serrated scraping edge 82 between the first end 84 and the second end 86, as opposed to the shorter length of a scraping edge that extends linearly between the first end 84 and the second end 86, provides an increase in the length of the scraping edge that is in contact with the conveyor belt 24 at the point of separation between the adherent conveyed material and the conveyor belt 24. Additional cleaning efficiency is also obtained by changing the angle of deflection of the adherent material at the point it meets the serrated scraping edge 82 and the corrugated front scraping surface 80. Instead of requiring the adherent material to make an immediate ninety degree separation from the conveyor belt 24, the side walls 120 of the ridges 112 provide a more gradual scraping angle with respect to the conveyor belt 24, such as from approximately forty-five degrees to approximately seventy-five degrees. Although the fluted scraper blade 20 has been shown in FIG. 1 as part of a primary conveyor belt cleaner 22, the fluted scraper blade 20 may also be used in connection with a secondary conveyor belt cleaner.

A modified embodiment of the scraper blade of the present invention is shown in FIGS. 4 and 5 and is identified with the reference number 150. The scraper blade 150 includes a mounting base 152 constructed substantially identical to the mounting base 60. The mounting base 152 includes a cylindrical bore 154 and spaced apart and generally parallel linear grooves 156A–B. The mounting base 152 does not include any springs 74, but can be provided with springs 74 if desired.

The scraper blade 150 includes a scraping tip 160. The scraping tip 160 is attached to and extends outwardly from the top end of the mounting base 152. The scraping tip 160 includes a front scraping surface 162 that extends from the bottom end of the scraping tip 160 to a serrated scraping edge 164. The scraping tip 160 also includes a rear surface 166 that extends from the bottom end of the scraping tip 160 to a serrated edge 168. An end wall 170 extends from the serrated edge 168 to the serrated scraping edge 164. The front scraping surface 162, rear surface 166 and end wall 170 extend between a generally planar first side wall 172 and spaced apart generally planar second side wall 174.

The front scraping surface 162 includes a plurality of parallel elongate grooves or flutes 180 that form a plurality of elongate ridges 182 and elongate valleys 184. Each ridge 182 includes a elongate apex 186 and each valley 184 includes an elongate nadir 188. Each flute 180 forms a side wall 190 that extends between an apex 186 of a ridge 182 and an adjacent nadir 188 of a valley 184, and a side wall 190 that extends between the nadir 188 of the valley 184 and the apex 186 of a second adjacent ridge 182.

The rear surface 166 includes a plurality of parallel elongate flutes 200 that form a plurality of elongate ridges 202 and a plurality of elongate valleys 184. Each ridge 202 includes an elongate apex 206 and each valley 204 includes an elongate nadir 208. A side wall 210 extends between the apex 206 of each ridge 202 and the nadir 208 of an adjacent valley 204.

The scraping tip 160 of the scraper blade 150 is constructed similar to the scraping tip 62 of the scraper blade 20. However, the apexes 186 and nadirs 188 of the ridges 182 and valleys 184 of the front scraping surface 162, and the apexes 206 and nadirs 208 of the ridges 202 and valleys 204 of the rear surface 166, are all curved or U-shaped. Each wall 210 may include a portion that extends generally linearly between a curved apex 186 and a curved nadir 208. The serrated scraping edge 164 and the serrated edge 168 may each conform to a generally sinusoidal-shaped curve.

As shown in FIG. 5, the front scraping surface 162 and the rear surface 166 are both curved as the scraper blade 150 is viewed from the side. However, if desired, the front scraping surface 162 and the rear surface 166 may respectively extend generally linearly from the mounting base 152 to the serrated scraping edge 164 and serrated edge 168.

A further modified embodiment of the scraper blade of the present invention is shown in FIGS. 6 and 7 and is identified with the reference number 230. The scraper blade 230 includes a mounting base 232 having a generally T-shaped member 234 that is adapted to fit within a generally T-shaped slot of a mounting member on a cross shaft (not shown). Alternatively, the mounting base 232 may be formed in the same manner as the mounting base 60, or in other well known configurations as desired.

The scraper blade 230 includes a scraping tip 238 attached to and extending outwardly from the top end of the mounting base 232. The scraping tip 238 includes a front scraping surface 240 that extends from the mounting base 232 to a serrated scraping edge 242. A rear surface 246 extends from the mounting base 232 to a generally linear edge 248. An end wall 250 extends between the linear edge 248 and the serrated scraping edge 242. The front scraping surface 240, rear surface 246, and end wall 250 extend between a generally planar first side wall 252 and a generally planar second side wall 254.

The front scraping surface 240 includes a plurality of elongate parallel flutes 260 which form a plurality of elongate ridges 262 and a plurality of elongate valleys 264. Each ridge 262 includes an elongate apex 266 and each valley 264 includes an elongate nadir 268. Each apex 266 is generally V-shaped and each nadir 268 is curved or generally U-shaped. The front scraping surface 240 is thereby constructed substantially identical to the front scraping surface 80 of the fluted scraper blade 20.

The rear surface 246 of the fluted scraper blade 230 does not include any flutes and extends generally linearly from the first side wall 252 to the second side wall 254. Thus the front scraping surface 240 is corrugated while the rear surface 246 is non-corrugated and extends generally linearly across the width of the scraping tip 238.

A further embodiment of the scraper blade of the present invention is shown in FIGS. 8 and 9 and is designated with the reference number 280. The scraper blade 280 is constructed substantially in the same manner as the scraper blade 230 as shown in FIGS. 6 and 7, except that the scraper blade 280 includes a plurality of helical springs 282 in a mounting base 284. The springs 282 extend from adjacent the bottom of the mounting base 284 toward the scraping tip 286 and facilitate resilient flexure of the scraping tip 286 with respect to the mounting base 284.

FIGS. 10A–10F show various configurations in which the corrugated front scraping surface and the serrated scraping edge of the fluted scraper blade of the present invention may be corrugated or serrated. FIG. 10A shows a fluted scraper blade 300 including a corrugated front scraping surface 302 having a serrated scraping edge 304, each of which have a polygonal wave configuration, and in particular a generally saw-tooth configuration. The scraper blade 300 includes an end wall 306.

Figure 10B:
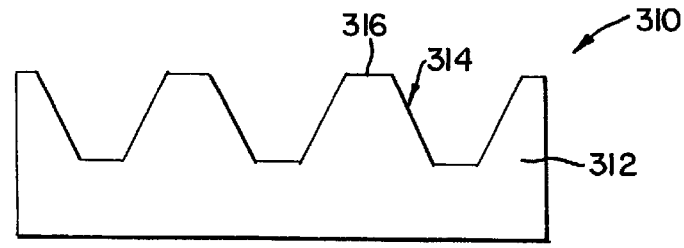
FIG. 10B is a partial rear elevational view of a modified embodiment of the fluted scraper blade with a serrated scraping edge having a polygonal screw thread configuration.

FIG. 10B shows a fluted scraper blade 310 having an end wall 312 and a corrugated front scraping surface 314 having a serrated scraping edge 316. The corrugated front scraping surface 314 and the serrated scraping edge 316 each have a polygonal wave configuration including a plurality of generally linear or planar segments arranged in a generally ACME thread configuration.

Figure 10C:
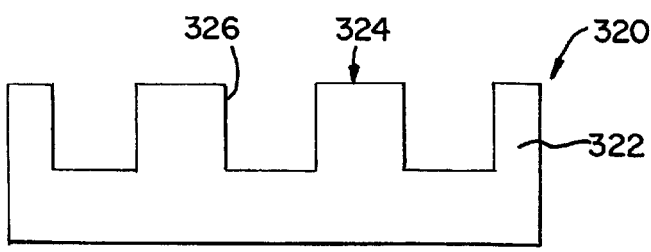
FIG. 10C is a partial rear elevational view of a modified embodiment of the fluted scraper blade with a serrated scraping edge having a square wave configuration.

FIG. 10C shows a fluted scraper blade 320 having an end wall 322 and a corrugated front scraping surface 324 including a serrated scraping edge 326. The front scraping surface 320 and the serrated scraping edge 326 each have a polygonal wave configuration, and in particular a generally square wave configuration.

Figure 10D:
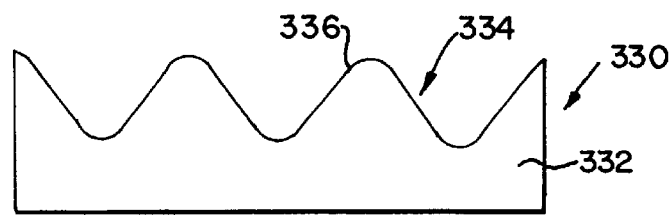
FIG. 10D is a partial rear elevational view of a modified embodiment of the fluted scraper blade with a serrated scraping edge having a sinusoidal wave configuration.

FIG. 10D shows a fluted scraper blade 330 having an end wall 332 and a corrugated front scraping surface 334 including a serrated scraping edge 336. The corrugated scraping surface 334 and the serrated scraping edge 336 each have a generally sinusoidal wave configuration. The configuration of the front scraping surface 334 and the serrated scraping edge 336 is similar to the configuration of the front scraping surface 162 and serrated scraping edge 164 of the scraper blade 150 as shown in FIGS. 4 and 5.

Figure 10E:
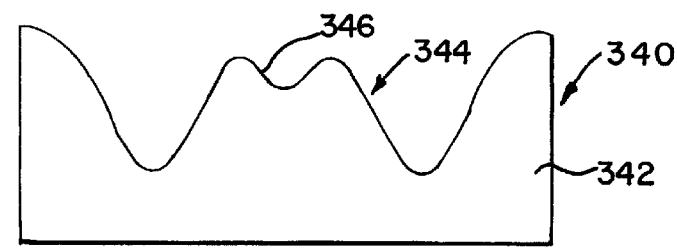
FIG. 10E is a partial rear elevational view of a modified embodiment of the fluted scraper blade with a serrated scraping edge having an irregular sign wave configuration.

FIG. 10E shows a fluted scraper blade 340 having an end wall 342 and a corrugated front scraping surface 344 including a serrated scraping edge 346. The corrugated scraping surface 344 and the serrated scraping edge 346 have an irregular configuration including a combination of two different sinusoidal wave configurations. Each sinusoidal wave configuration includes a different frequency or distance between apexes of the ridges and a different amplitude or depth of the valleys with regard to the apexes of the ridges.

Figure 10F:
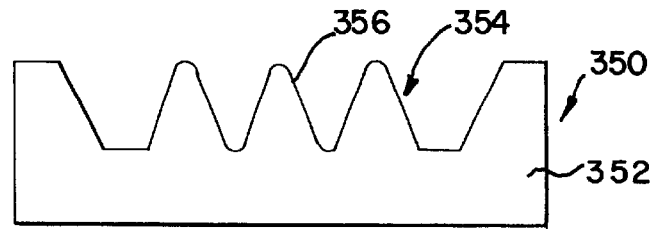
FIG. 10F is a partial rear elevational view of a modified embodiment of the fluted scraper blade with a serrated scraping edge having a configuration including a combination of a sign wave and a polygonal wave.

FIG. 10F shows a fluted scraper blade 350 having an end wall 352 and a corrugated front scraping surface 354 including a serrated scraping edge 356. The corrugated scraping surface 354 and the serrated scraping edge 356 each have a configuration including the combination of a sinusoidal wave located between two polygonal waves.

As shown above various different regular and irregular corrugation configurations and serration configurations can be used for the front scraping surface and the serrated scraping edge of the scraper blades. Also as shown above it is possible to combine various configurations with one another. Combining configurations enables the best attributes of each configuration to be used where the most benefit can be derived. For example, it may be desirable to have a stronger cross section in a portion of the scraper blade near the abutting edges of the scraper blades rather than in the center of the scraper blade. In addition, when a single scraper blade extends across the entire width of a conveyor belt, rather than being divided into a plurality of individual scraper blades, it may be desirable to have a less aggressive corrugation and serration configuration near the edges of the belt where the cleaning requirements are less demanding.

Figure 12:
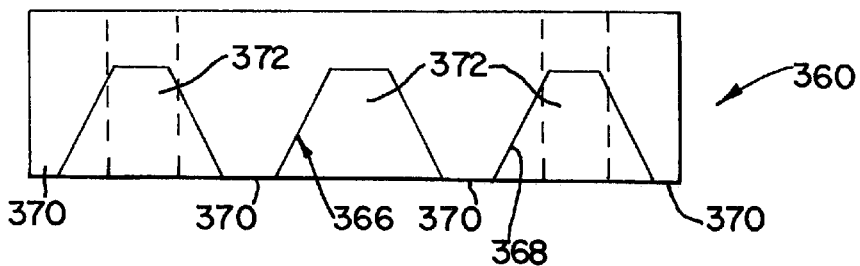
FIG. 12 is a top plan view taken along line 12—12 of FIG. 11.
Figure 11:
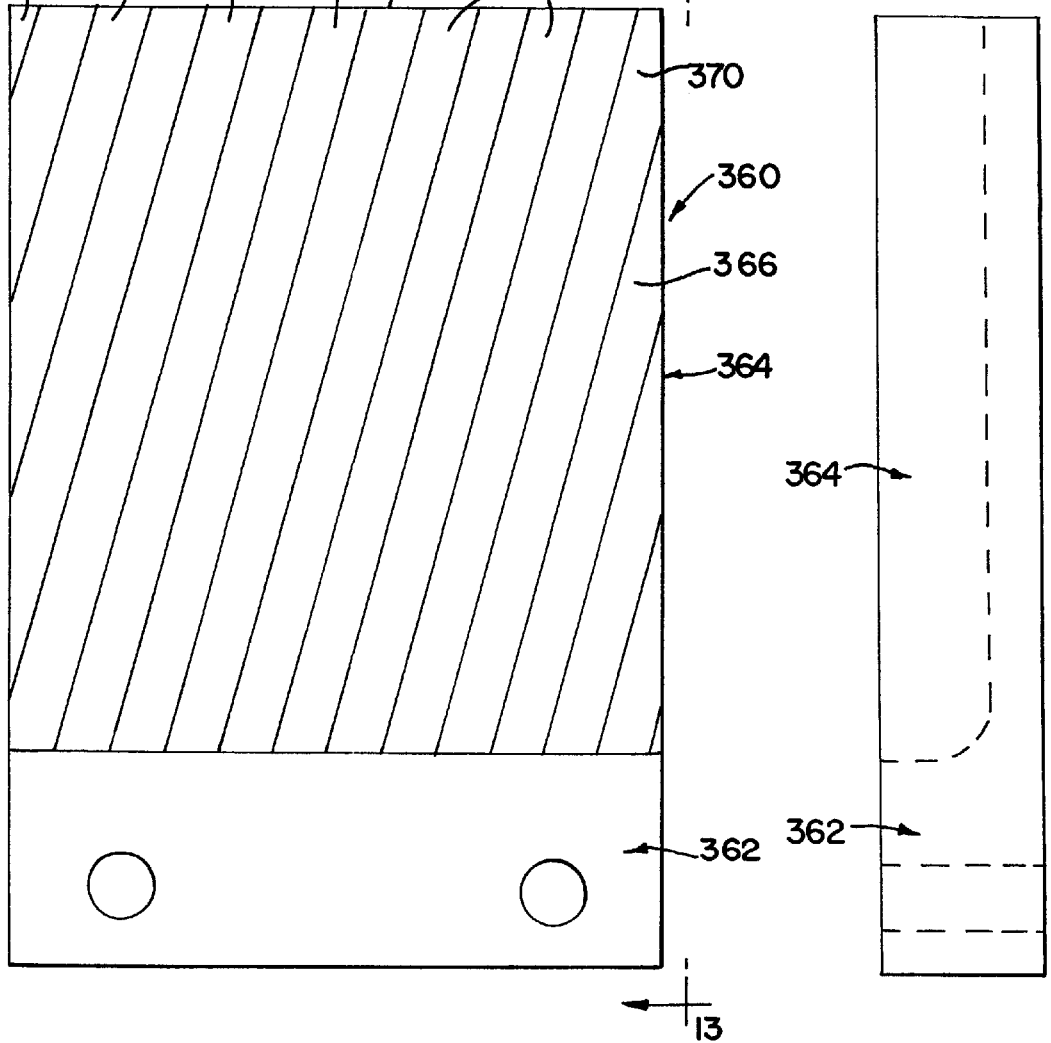
FIG. 11 is a front elevational view of a further modified embodiment of the fluted scraper blade of the present invention.
Figure 13:
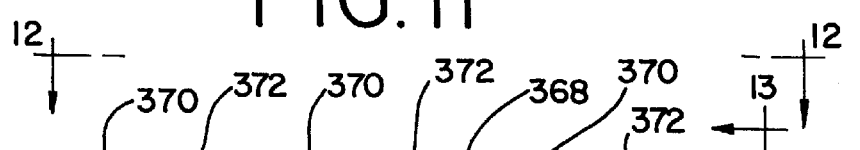
FIG. 13 is a side elevational view taken along line 13—13 of FIG. 11.

FIGS. 11–13 show another embodiment of the fluted scraper blade of the present invention designated with the reference number 360. The scraper blade 360 includes a mounting base 362 and a scraping tip 364. The scraping tip 364 includes a corrugated front scraping surface 366 having a generally serrated scraping edge 368. The front scraping surface 366 includes a plurality of elongate ridges 370 and a plurality of elongate valleys 372 arranged in an alternating pattern. As best shown in FIG. 12, the front scraping surface 366 and the serrated scraping edge 368 have a generally polygonal configuration in the form of an ACME screw thread. However, other configurations may be used as described above. As best shown in FIG. 11, a plurality of the ridges 370 and valleys 372 extend from the serrated scraping edge 368 toward the bottom end of the scraping tip 364 at the mounting base 362. The ridges 370 and valleys 372 are located generally parallel to one another, but are inclined or biased at an angle to vertical and are located at an acute angle to the scraping edge 368. A horizontal corrugated configuration of the front scraping surface and of the serrated scraping edge as shown in FIGS. 1–9, wherein the undulations occur in a horizontal direction, tends to mark the conveyor belt as slightly more wear occurs at the thinner portions of the scraper blade as it is easier for adherent material to pass through the thinner portions of the scraper blade than through the thicker portions. When material passes through the thinner portions of the scraper blade at a greater rate than through the thicker portions of the scraper blade, there is a tendency for the belt to wear at different rates. By biasing the ridges and valleys of the front scraping surface, the position of the ridges and valleys of the serrated scraping edge that are in engagement with the conveyor belt is constantly changing with respect to the belt over the wear life of the scraper blade so that streaking or marking of the belt is less likely.

Figure 15:
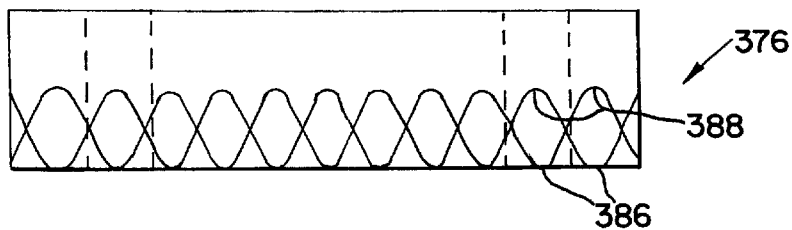
FIG. 15 is a top plan view taken along line 15—15 of FIG. 14.
Figures 14, 16:
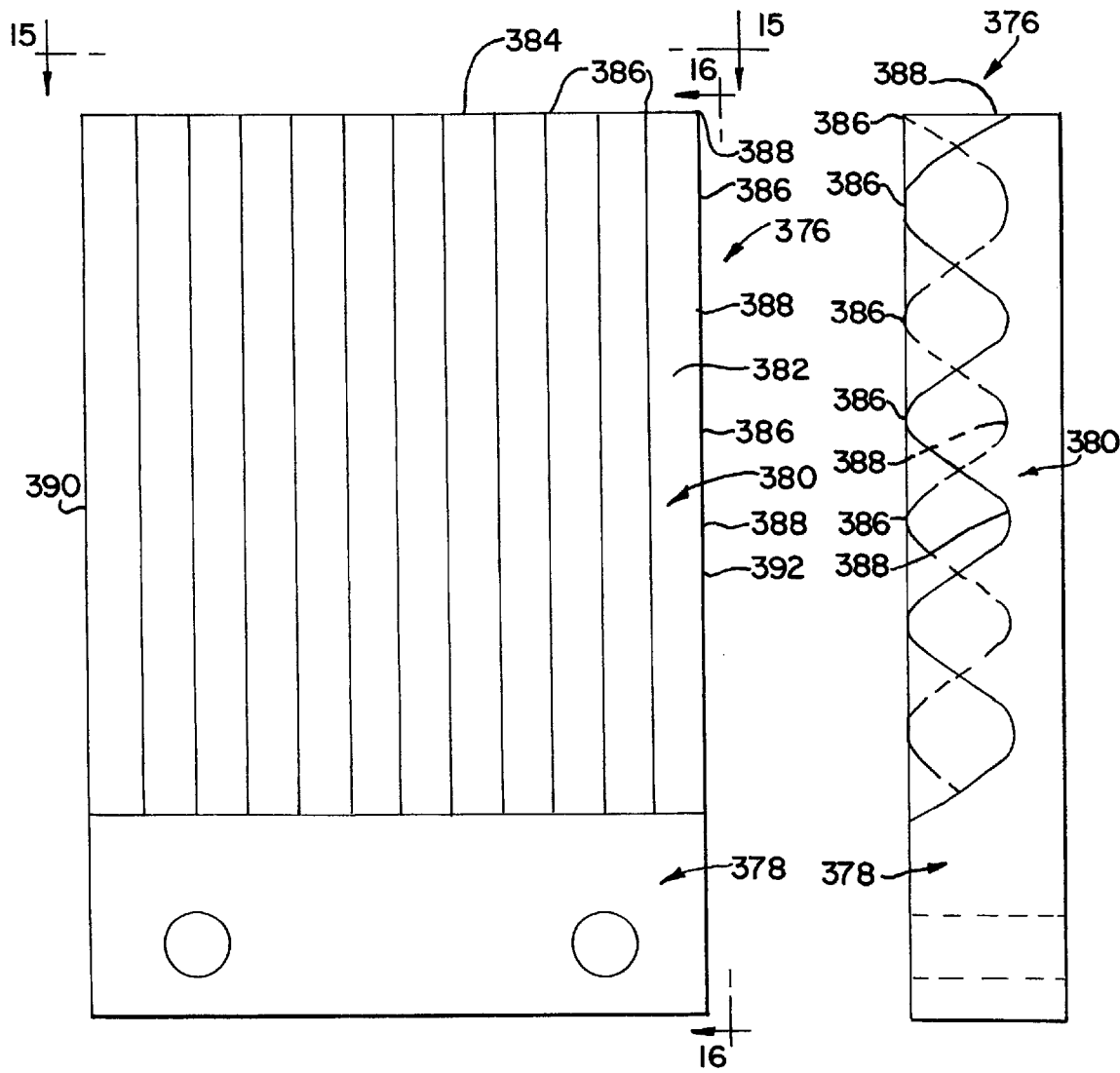
FIG. 14 is a front elevational view of another embodiment of the fluted scraper blade of the present invention.
FIG. 16 is a side elevational view taken along line 16—16 of FIG. 14.

FIGS. 14–16 show a further embodiment of the fluted scraper blade of the present invention identified with the reference number 376. The scraper blade 376 includes amounting base 378 and a scraping tip 380 attached to and extending outwardly from the mounting base 378. The scraping tip 380 includes a front scraping surface 382 having a generally serrated scraping edge 384. The front scraping surface 382 has a corrugated configuration including a plurality of alternating ridges 386 and valleys 388. The scraping surface 382 is corrugated in a horizontal direction as the front scraping surface 382 extends horizontally from a first generally linear side edge 390 to a second generally linear side edge 392. The front scraping surface 382 is also corrugated in a vertical direction from the scraping edge 384 toward the bottom end of the scraping tip 380 at the mounting base 378. The front scraping surface 382 is corrugated both vertically and horizontally such that the front scraping surface 382 undulates along a vertical axis and along a perpendicular horizontal axis. The bidirectional corrugation of the front scraping surface 382 forms a plurality of peaks or ridges 386 and a plurality of valleys 388. The front scraping surface 382 thereby has a generally waffle-like corrugated configuration. This configuration of the front scraping surface 382 also provides the advantage that the position of the ridges and valleys of the serrated scraping edge 384 that are in engagement with the conveyor belt is constantly changing with respect to the belt over the wear life of the scraper blade to avoid the likelihood of streaking or marking the conveyor belt.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A scraper blade for a conveyor belt cleaner including:
   a scraping tip having a bottom end, a front surface extending from said bottom end to a first edge, and a rear surface extending from said bottom end to a second edge, said first edge of said front surface extending between a first end and a second end and having a generally serrated configuration, said serrated configuration of said first edge of said front surface including one or more ridges and a valley located adjacent each said ridge, said first edge adapted to engage a conveyor belt continuously along said first edge.

2. The scraper blade of claim 1 including a mounting base attached to said bottom end of said scraping tip.

3. The scraper blade of claim 2 wherein said mounting base includes one or more resilient biasing members adapted to provide pivotal movement of said scraping tip with respect to said mounting base.

4. The scraper blade of claim 1 wherein said first edge of said front surface is serrated in a direction extending toward said second edge of said rear surface.

5. The scraper blade of claim 1 wherein said front surface of said scraping tip has a generally corrugated configuration.

6. The scraper blade of claim 5 wherein said front surface is corrugated such that said front surface undulates from side to side.

7. The scraper blade of claim 5 wherein said front surface is corrugated such that said front surface undulates in a direction from said first edge toward said bottom end of said scraping tip.

8. The scraper blade of claim 1 wherein said front surface of said scraping tip includes a plurality of ridges extending from said first edge toward said bottom end of said scraping tip.

9. The scraper blade of claim 8 wherein said ridges of said front surface are inclined.

10. The scraper blade of claim 1 wherein said front surface includes one or more elongate ridges and one or more elongate valleys extending from said first edge toward said bottom end of said scraping tip, each said ridge of said front surface being located adjacent to a respective valley of said front surface.

11. The scraper blade of claim 1 wherein said ridges of said first edge are generally V-shaped.

12. The scraper blade of claim 1 wherein said ridges of said first edge are generally U-shaped.

13. The scraper blade of claim 1 wherein said first surface is curved between said first edge and said bottom end of said scraping tip.

14. The scraper blade of claim 1 wherein said serrated configuration of said first edge of said front surface comprises a generally sinusoidal wave configuration.

15. The scraper blade of claim 1 wherein said serrated configuration of said first edge of said front surface comprises a generally polygonal wave configuration.

16. The scraper blade of claim 1 wherein said serrated configuration of said first edge of said front surface comprises a generally sinusoidal wave configuration portion and a generally polygonal wave configuration portion.

17. The scraper blade of claim 1 wherein said first edge of said front surface undulates in an irregular pattern between said first end and said second end of said first edge.

18. The scraper blade of claim 1 wherein said ridges of said first edge are nonuniformly spaced apart from one another along said first edge.

19. The scraper blade of claim 1 wherein each said ridge of said first edge has one of two or more heights.

20. The scraper blade of claim 1 wherein said scraping tip includes an end wall extending between said first edge of said front surface and said second edge of said rear surface.

21. The scraper blade of claim 1 wherein said second edge of said rear surface is generally linear.

22. The scraper blade of claim 1 wherein said second edge of said rear surface has a generally serrated configuration.

23. The scraper blade of claim 1 wherein said first edge of said first surface includes one or more first ridges and one or more first valleys, and said second edge of said second surface has a generally serrated configuration, said second edge including one or more second ridges and one or more second valleys, each said first ridge being aligned with a respective second valley, and each said first valley being aligned with a respective second ridge.

24. The scraper blade of claim 1 wherein said rear surface has a generally corrugated configuration.

25. The scraper blade of claim 1 wherein said rear surface includes a plurality of elongate flutes extending from said second edge of said rear surface toward said bottom end of said scraping tip.

26. The scraper blade of claim 1 wherein said rear surface includes one or more elongate ridges and one or more elongate valleys, said ridges and said valleys extending from said second edge toward said bottom end of said scraping tip.

27. The scraper blade of claim 26 wherein each said ridge is generally V-shaped.

28. A scraper blade for a conveyor belt cleaner including:
a scraping tip having a bottom end, a front surface extending from said bottom end of said scraping tip to a first edge, and a rear surface extending from said bottom end of said scraping tip to a second edge, said front surface including a generally corrugated configuration having one or more elongate ridges and one or more elongate valleys extending from said first edge toward said bottom end of said scraping tip.

29. The scraper blade of claim 28 wherein each said ridge of said front surface has one of two or more heights.

30. The scraper blade of claim 28 including a mounting base, said bottom end of said scraping tip attached to said mounting base.

31. The scraper blade of claim 28 wherein said first edge of said front surface has a generally serrated configuration.

32. The scraper blade of claim 28 wherein said rear surface of said scraping tip has a generally corrugated configuration.

33. The scraper blade of claim 28 wherein said ridges of said front surface are nonuniformly spaced apart from one another.

34. The scraper blade of claim 28 wherein said corrugated configuration of said front surface comprises a generally sinusoidal wave configuration.

35. The scraper blade of claim 28 wherein said corrugated configuration of said front surface comprises a generally polygonal wave configuration.

36. The scraper blade of claim 28 wherein said corrugated configuration of said front surface comprises a generally sinusoidal wave configuration portion and a generally polygonal wave configuration portion.

37. The scraper blade of claim 28 wherein said front surface undulates in an irregular pattern.

* * * * *